United States Patent
Nakarmi et al.

(10) Patent No.: US 9,369,873 B2
(45) Date of Patent: Jun. 14, 2016

(54) NETWORK APPLICATION FUNCTION AUTHORISATION IN A GENERIC BOOTSTRAPPING ARCHITECTURE

(75) Inventors: Prajwol Kumar Nakarmi, Kista (SE); Oscar Ohlsson, Huddinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/396,016

(22) PCT Filed: Apr. 26, 2012

(86) PCT No.: PCT/EP2012/057693
§ 371 (c)(1),
(2), (4) Date: Oct. 21, 2014

(87) PCT Pub. No.: WO2013/159818
PCT Pub. Date: Oct. 31, 2013

(65) Prior Publication Data
US 2015/0065089 A1     Mar. 5, 2015

(51) Int. Cl.
*H04W 12/04* (2009.01)
*H04W 12/08* (2009.01)
(Continued)

(52) U.S. Cl.
CPC ............. *H04W 12/08* (2013.01); *H04L 9/083* (2013.01); *H04L 9/321* (2013.01); *H04L 63/062* (2013.01); *H04L 63/0815* (2013.01); *H04L 2209/80* (2013.01); *H04L 2463/061* (2013.01); *H04W 12/04* (2013.01)

(58) Field of Classification Search
CPC .............................. H04W 12/04; H04W 12/08
USPC .......................................................... 455/411
See application file for complete search history.

(56) References Cited

U.S. PATENT DOCUMENTS

| | | | |
|---|---|---|---|
| 2009/0209232 A1* | 8/2009 | Cha ................ | H04L 63/0428 455/411 |
| 2010/0049980 A1* | 2/2010 | Barriga ............. | H04L 12/66 713/171 |
| 2013/0139235 A1* | 5/2013 | Counterman ...... | H04L 63/061 726/7 |

OTHER PUBLICATIONS

3GPP TR 33.914 V0.65.0 (Dec. 2011) $3^{rd}$ Generation Partnership Project; Technical Specification Group Services and System Aspects; Single Sign on Application Security for Common IMS—based on SIP Digest (Release 11); 650 Route des Lucioles—Sophia Antipolis, Valbonne, France; 44 pages. (Track Changes).

(Continued)

*Primary Examiner* — Michael Neff
(74) *Attorney, Agent, or Firm* — Myers Bigel & Sibley, P.A.

(57) ABSTRACT

A method of authorizing a subscriber user equipment to access a Network Application Function, NAF, in a Generic Bootstrapping Architecture, GBA. The method includes, at a Bootstrapping Server Function, BSF, receiving a request for key material for the subscriber user equipment from the NAF, wherein the NAF is associated with one or more NAF identifiers, NAF_IDs, obtaining subscriber information from a Home Subscriber System, HSS, the information including one or more NAF_IDs that are valid for the subscriber, authorizing the subscriber user equipment on the basis of the identity of said NAF and the NAF_ID(s) included within the subscriber information. In the event that the subscriber user equipment is authorized, key material is derived using a NAF_ID that is contained within said subscriber information; and the key material is sent to the NAF.

14 Claims, 8 Drawing Sheets

(51) Int. Cl.
    *H04L 29/06* (2006.01)
    *H04L 9/08* (2006.01)
    *H04L 9/32* (2006.01)

(56) References Cited

OTHER PUBLICATIONS

3GPP TR 33.914 V0.6.0 (Dec. 2011) 3$^{rd}$ Generation Partnership Project; Technical Specification Group Services and System Aspects; Single Sign on Application Security for Common IMS—based on SIP Digest (Release 11); 650 Route des Lucioles—Sophia Antipolis, Valbonne, France; 44 pages. (Clean Copy).

International Search Report for International Application No. PCT/EP2012/057693 mailed May 6, 2013, 3 pages.
Written Opinion of the International Searching Authority for International Application No. PCT/EP2012/057693 mailed May 6, 2013, 7 pages.
3GPP TS 33.220 V11.2.0 (Mar. 2012) 3$^{rd}$ Generation Partnership Project; Technical Specification Group Services and System Aspects; Generic Authentication Architecture (GAA); Generic Bootstrapping Architecture (GBA) (Release 11); 650 Route des Lucioles—Sophia Antipolis, Valbonne, France; 92 pages.
Ericsson: "Introduction of GBA Push within TS 29.109—Zpn Interface" 3GPP TSG CT WG4 Meeting #42, San Antonio, USA, Feb. 9-19, 2009, C4-090614; Change Request, Version 8.0.0, 20 pages.

* cited by examiner

NETWORK APPLICATION FUNCTION AUTHORISATION IN A GENERIC BOOTSTRAPPING ARCHITECTURE

CROSS REFERENCE TO RELATED APPLICATION

This application is a 35 U.S.C. §371 national stage application of PCT International Application No. PCT/EP2012/057693, filed on 26 Apr. 2012, the disclosure and content of which is incorporated by reference herein in its entirety. The above-referenced PCT International Application was published in the English language as International Publication No. WO 2013/159818 A1 on 31 Oct. 2013.

TECHNICAL FIELD

The present invention relates to methods and apparatus for use in a Generic Bootstrapping Architecture. More particularly, the invention relates to methods and apparatus for authorising a subscriber user equipment.

BACKGROUND

In order to facilitate the provision of services to user terminals, a mobile network such as a 3G network will often require the establishment of a secure communication channel or "security association" between client terminals (i.e. mobile terminals) and the network-based service nodes which provide the services. The Generic Bootstrapping Architecture (GBA) defined in the 3GPP Technical Specification TS 33.220 V11.1.0 (2011-12) provides a mechanism whereby a client terminal (UE) can be authenticated to a Network Application Function (NAF) (i.e. an Application Server), and secure session keys obtained for use between the client terminal and the NAF. FIG. 1 illustrates schematically an example of the simple network model for the GBA, as described in 3GPP TS 33.220, which comprises a Bootstrapping Server Function (BSF), a Network Authentication Function (NAF), a Subscriber Locator Function (SLF), a Home Subscriber System (HSS) and the User Equipment (UE). Communication between the NAF and the UE takes place over reference point Ua, communication between the NAF and the BSF takes place over reference point Zn, communication between the UE and the BSF takes place over reference point Ub, communication between the BSF and the HSS takes place over reference point Zh and communication between the BSF and the SLF takes place over reference point Dz.

When the UE wishes to contact a NAF and no security association between the UE and the NAF has been established at an earlier stage, the UE may contact the NAF with a request for communication and the request may not include any GBA-related parameters. If the NAF requires the use of a security association obtained by means of the GBA, the NAF may respond to the UE with a bootstrapping initiation message. The UE will then start a bootstrapping procedure with the BSF. The GBA provides a mechanism to bootstrap the Authentication and Key Agreement (AKA) for application security from the 3GPP AKA mechanism described in 3GPP TS 33.102. This mechanism allows a UE to be authenticated to a BSF and to obtain a master key (Ks) and a Bootstrapping Transaction Identifier (B-TID). GBA User Security Settings (GUSS) is a set of all user security settings and is stored in the HSS. During the bootstrapping procedure, the BSF obtains the GUSS from the HSS. The bootstrapping procedure is indicated in FIG. 2 as step 2.1).

The master key Ks is shared between the UE and the BSF, but not with the NAF. Instead, an application specific key Ks_NAF is derived by the UE. The derivation of Ks_NAF is based on Ks and a NAF_ID, whereby the NAF_ID is constructed by a concatenation of a Fully Qualified Domain Name (FQDN) of the NAF and a security protocol identifier of reference point Ua. The derivation of Ks_NAF is described in 3GPP TS 33.220 and indicated in FIG. 2 as step 2.2).

The UE then supplies the B_TID to the NAF over reference point Ua in an application request. This step is indicated in FIG. 2 as step 2.3). After receipt of the application request at the NAF, the NAF determines the NAF_ID and verifies that the user is authorized to use the NAF_ID, as indicated by step 2.4.1 in FIG. 2. The NAF then sends an authentication request including the B-TID and the NAF_ID to the BSF, as indicated by step 2.4.2 in FIG. 2.

On receipt of the authentication request, the BSF looks up the master key Ks using the B-TID and the BSF derives the application specific key Ks_NAF based on Ks and the NAF_ID supplied by the NAF. This step is illustrated as step 2.5) in FIG. 2. The BSF sends an authentication answer including the Ks_NAF back to the NAF, as indicated by step 2.6) in FIG. 2. The BSF may also include other information, such as the bootstrapping time and the lifetime of the key, in the authentication answer to the NAF. If the key identified by the B_TID is not available at the BSF, the BSF will indicate this in a reply to the NAF and the NAF will then send a bootstrapping renegotiation request to the UE.

The NAF and the UE now both know the value of Ks_NAF and they can use that key to protect communication (step 2.7) between the NAF and the UE over reference point Ua.

The derivation of the application specific key Ks_NAF is based on the NAF_ID of the NAF and the NAF_ID is in turn based on the FQDN of the NAF. A particular FQDN uniquely identifies a NAF. The Ks_NAF derived at the UE will be the same as the Ks_NAF derived at the BSF if one of the following three situations occurs. First, the NAF has only one FQDN. Second, the NAF has multiple FQDNs, and each FQDN is tied to a separate IP address. The NAF may determine which FQDN was used by the UE for key derivation by analyzing the destination IP of the incoming request. Third, the NAF has multiple FQDNs, and the UE may include the FQDN that was used for key derivation in its request (e.g. in the Host header of an HTTP request). This third situation could be the case when the NAF has only one IP address but multiple FQDNs. Therefore, the NAF needs to know which FQDN was used by the UE so that it can obtain the correct Ks_NAF from the BSF. The NAF then validates the FQDN and sends this FQDN to the BSF.

In some cases, it is desirable to divide one physical NAF node into several logical NAFs serving different sets of users. For example, a service provider that deploys a single NAF node which is accessible from several enterprise networks may want to ensure that users from different enterprises cannot interfere with each other. There are several ways of accomplishing such a separation, but one that is particularly convenient is to assign a separate FQDN to each enterprise (e.g., naf.enterpriseX.com) and to use the multiple FQDNs to distinguish between users. In order for the use of a particular FQDN from the larger set of FQDNs to be secure however, the NAF must verify that a user is authorized to use a particular FQDN. Authorisation of a user requires the maintenance of a user database at the NAF or requires the enterprise name to be incorporated in the user ID.

There are also other scenarios where the need for multiple FQDNs might arise. A NAF could, for example, be known under a first FQDN when the NAF is accessed from an internal network and be known under a second FQDN when the NAF is accessed from the public Internet.

The storing of multiple FQDNs in the NAF and associating the multiple FQDNs with different sets of users quickly becomes an administrative burden. The problem becomes even worse when there are multiple NAFs to maintain and when FQDNs and users change quickly.

SUMMARY

It is an object of the present invention to overcome or at least mitigate the above noted disadvantages. These objects are achieved by providing all FQDN related information in the HSS, together with all other user data, instead of having each NAF maintain the FQDN related information on its own.

According to a first aspect of the present invention there is provided a method of authorising a subscriber user equipment to access a Network Application Function, NAF, in a Generic Bootstrapping Architecture, GBA. The method comprises, at a Bootstrapping Server Function, BSF, receiving a request for key material for the subscriber user equipment from the NAF, wherein the NAF is associated with one or more NAF identifiers, NAF_IDs, obtaining subscriber information from a Home Subscriber System, HSS, the information including one or more NAF_IDs that are valid for the subscriber, authorising the subscriber user equipment on the basis of the identity of said NAF and the NAF_ID(s) included within the subscriber information. In the event that the subscriber user equipment is authorised, key material is derived using a NAF_ID that is contained within said subscriber information; and the key material is sent to said NAF.

The request may include a NAF identifier and said step of authorising may comprise matching the NAF identifier contained within the request with a NAF identifier included in said subscriber information.

Said request received from the NAF may not contain a NAF identifier.

The subscriber information may comprise GBA User Security Settings, GUSS. The NAF identifier may be constructed using a Fully Qualified Domain Name, FQDN.

According to a second aspect of the invention there is provided an apparatus configured to operate as a Bootstrapping Server Function, BSF, for use in a Generic Bootstrapping Architecture, GBA. The apparatus comprises a first receiver for receiving a request for key material for the subscriber user equipment from a Network Application Function, NAF, wherein the NAF is associated with one or more NAF identifiers. The apparatus further comprises a second receiver for receiving subscriber information from a Home Subscriber System, HSS, the information including one or more NAF identifiers that are valid for the subscriber. The apparatus further comprises a first processor for authorising the subscriber user equipment on the basis of the identity of said NAF and the NAF identifier(s) included within the subscriber information and a second processor arranged, in the event that the subscriber user equipment is authorised, to derive key material using a NAF identifier that is contained within said subscriber information. The apparatus further comprises a sender for sending the key material to said NAF.

The request may comprise a NAF identifier and the first processor may further be arranged to match the NAF identifier contained within the request with a NAF identifier included in said subscriber information. The subscriber related information may comprise GBA User Security Settings, GUSS. The NAF identifier may be constructed using a Fully Qualified Domain Name, FQDN.

According to a third aspect of the present invention there is provided method of authorising a subscriber user equipment to access a Network Application Function, NAF, in a Generic Bootstrapping Architecture, GBA. The method comprises, at the subscriber user equipment, sending a request to the NAF, wherein the NAF is associated with one or more NAF identifiers, NAF_IDs, and receiving the request at the NAF. At the NAF, an authentication request is sent to a Bootstrapping Server Function, BSF, and the authentication request is received at the BSF. At the BSF, subscriber information is obtained from a Home Subscriber System, HSS, and the information includes one or more NAF IDs that are valid for the subscriber. At the BSF, the subscriber user equipment is authorised on the basis of the identity of said NAF and the NAF_ID(s) included within the subscriber information. In the event that the subscriber user equipment is authorised, key material is derived using a NAF_ID that is contained within said subscriber information. The key material is sent to the NAF; and the key material is received at the NAF.

At the user equipment, the method may further comprise obtaining a temporary identifier, B-TID, and a master key from the BSF and including the B-TID in said request sent to the NAF, and, at the BSF, identifying a correct NAF identifier in the subscriber information using the B-TID.

The authentication request may include a NAF identifier and the step of authorising may comprise, at the BSF, matching the NAF identifier contained within the request with a NAF identifier included in said subscriber information.

The authentication request sent by the NAF may not contain a NAF identifier.

The subscriber related information may comprise GBA user security settings, GUSS.

The NAF identifier may be constructed using a fully qualified domain name, FQDN.

According to a fourth aspect of the invention there is provided a computer program comprising computer readable code which, when run on an apparatus, causes the apparatus to behave as an apparatus according to the second aspect of the invention.

According to a fifth aspect of the invention there is provided a computer program product comprising a computer readable medium and a computer program, wherein the computer program comprises computer readable code which, when run on an apparatus, causes the apparatus to behave as an apparatus according to the second aspect of the invention, and wherein the computer program is stored on the computer readable medium.

DETAILED DESCRIPTION

Figure 1:
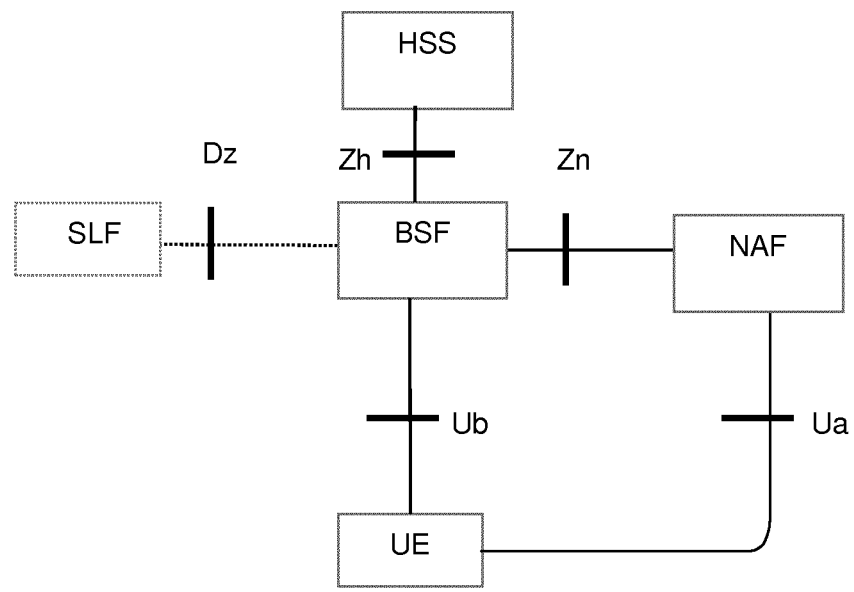
FIG. 1 illustrates schematically an example of a simple network model for the GBA.
Figure 2:
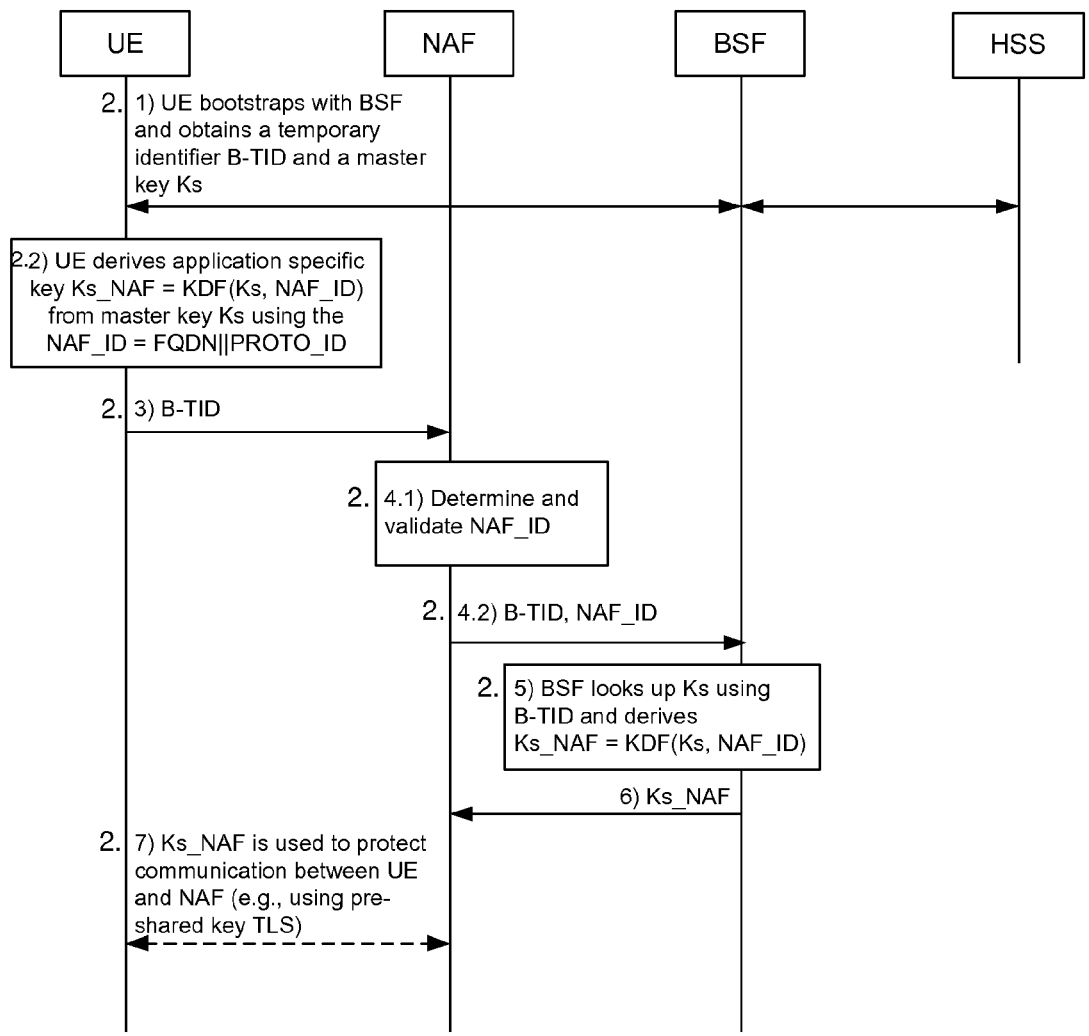
FIG. 2 illustrates an example signalling flow of a bootstrapping and key derivation mechanism provided by the GBA.

The Generic Bootstrapping Architecture (GBA) defined in the 3GPP Technical Specification TS 33.220 provides a mechanism whereby a client terminal (UE) can be authenticated to a Network Application Function (NAF), and secure session keys obtained for use between the UE and the NAF. As illustrated in FIG. 2, the GBA provides a mechanism whereby the UE bootstraps with a Bootstrapping Server Function (BSF) such that the UE is authenticated to the BSF and obtains a master key Ks and a Bootstrapping Transaction Identifier (B-TID). During bootstrapping, the BSF obtains GBA User Security Settings (GUSS) from a Home Subscriber System (HSS). The UE then derives an application specific key Ks_NAF based on the Ks and a NAF identifier, NAF_ID, whereby the NAF_ID is constructed by a concatenation of a Fully Qualified Domain Name (FQDN) of the NAF and a security protocol identifier of a reference point Ua over which communication between the UE and the NAF takes place. The UE then sends an application request including the B-TID to the NAF. On receipt of the request, the NAF determines and validates the NAF_ID. The NAF sends the B-TID and NAF_ID in an authentication request to the BSF. On receipt of the authentication request, the BSF looks up Ks using the received B-TID and derives the Ks_NAF based on the Ks and the NAF_ID. The Ks_NAF is sent by the BSF in an authentication answer to the NAF. The NAF and the UE now share the same key Ks_NAF which can be used to protect communications between the NAF and the UE.

It may be desirable to divide one physical NAF node into a plurality of logical NAFs serving different users. A separate FQDN may then be assigned to each user, or to each group of users. During derivation of the key Ks_NAF, the NAF has to validate the NAF_ID by verifying that a particular user is authorised to use a particular FQDN on which the NAF_ID is based. The storing of multiple FQDNs in the NAF and associating them with different users would be an administrative burden to the NAF.

All FQDN related information may be provided in the HSS, together with all other user data, instead of having each NAF maintain the FQDN related information on its own. In this way, deployment and administration of NAF nodes become less complicated. The set of FQDNs a UE is allowed to use when contacting a particular NAF may be included in the GUSS delivered from the HSS to the BSF during bootstrapping. The BSF can either forward the authorization information to the NAF or it can enforce it on its own.

Figure 3:
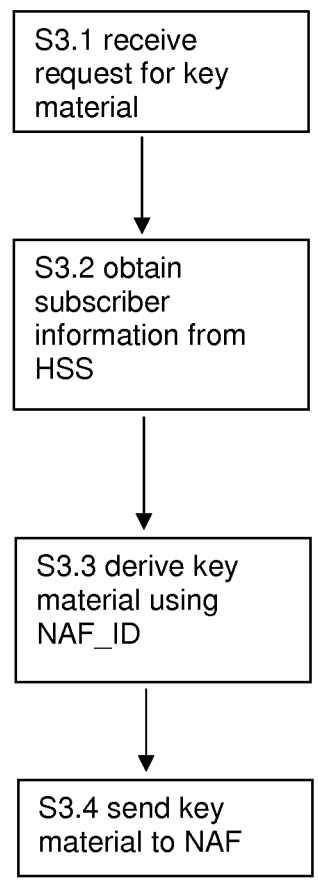
FIG. 3 is a flow diagram illustrating a method of authorising a subscriber user equipment.

FIG. 3 is a flow diagram illustrating, at a high level, the steps carried out at the BSF for deriving the key material when the FQDN related information is obtained from the HSS instead of being stored in the NAF. When the BSF receives (S3.1) a request for key material, the BSF obtains (S3.2) subscriber information including the FQDNs from the HSS. Alternatively, the order of these two steps (S3.1 and S3.2) may be different, e.g. if the BSF obtains the subscriber information with the FQDNs during the initial bootstrapping procedure.

Figure 4:
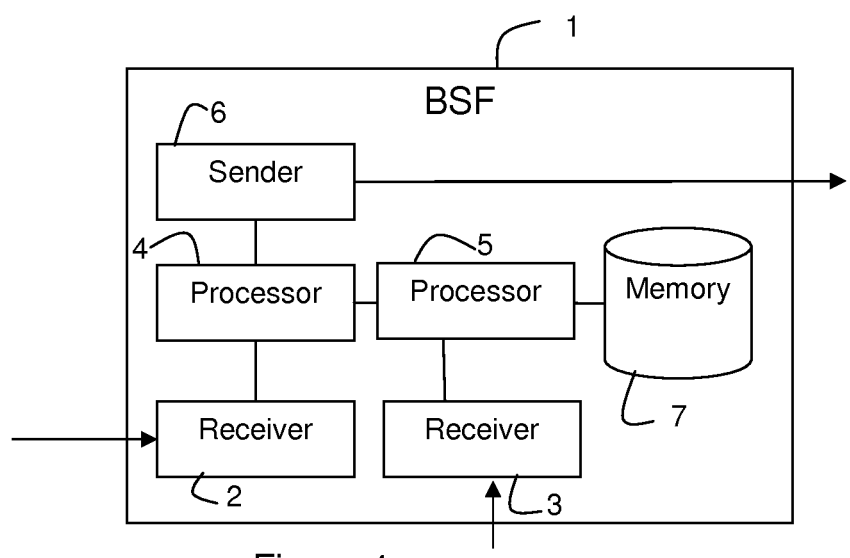
FIG. 4 illustrates schematically an example of a BSF suitable for implementing a method of authorising a subscriber user equipment.

FIG. 4 illustrates schematically an example of a BSF 1 suitable for implementing a method of authorising a subscriber UE to access the NAF. The BSF 1 can be implemented as a combination of computer hardware and software. The BSF 1 comprises a receiver 2 for receiving an authorisation request from the NAF and a second receiver 3 for receiving the subscriber information including the FQDNs from the HSS. The BSF 1 comprises a first processor 4 for verifying on the basis of the subscriber information that the UE is allowed to use a particular FQDN. The BSF 1 comprises a second processor 5 for deriving the key Ks_NAF. The BSF 1 comprises a sender 6 for sending an authentication answer to the NAF. The BSF 1 also comprises a memory 7 for storing data.

Figure 5:
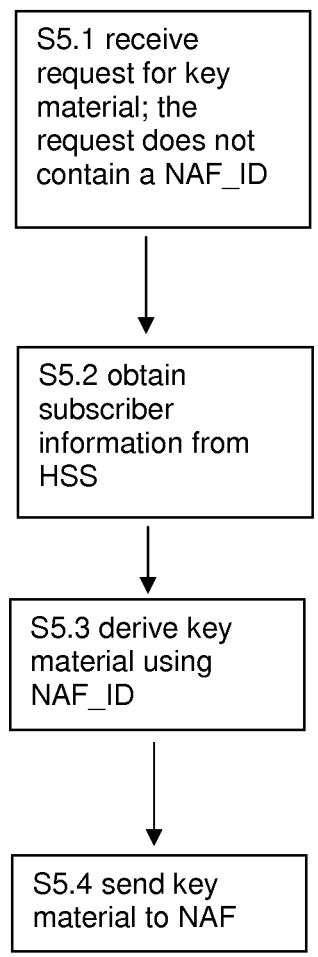
FIG. 5 is a flow diagram illustrating a method of authorising a subscriber user equipment according to a first embodiment.

Considering this approach in more detail, a first embodiment is illustrated in FIG. 5, which is a flow diagram illustrating method steps at the BSF for generating an authentication answer. The BSF receives (S5.1) a request for key material from the NAF and obtains (S5.2) subscriber information from the HSS. As the subscriber information including the FQDNs which the UE is authorised to use is obtained from the HSS, the request for key material does not need to contain a NAF_ID. The key material is derived (S5.3) by the BSF and sent (S5.4) to the NAF. The role of determining and validating the NAF_ID is moved from the NAF to the BSF, thereby reducing the administrative burden on the NAF node.

Figure 6:
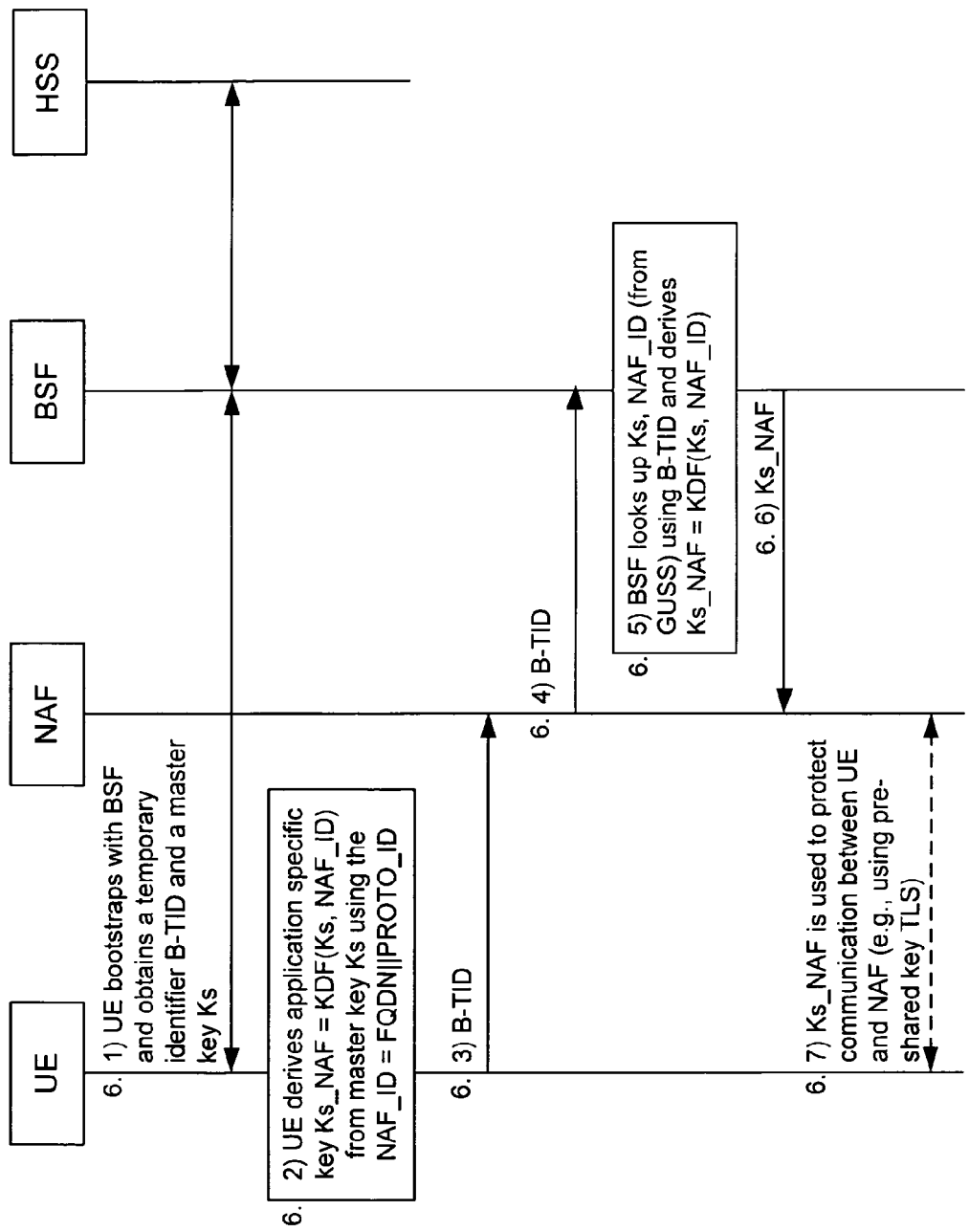
FIG. 6 illustrates a signalling flow associated with the first embodiment.

This first embodiment is now described in more detail with reference to FIG. 6. During bootstrapping (step 6.1 in FIG. 6), the UE obtains a B-TID and a master key Ks and the BSF obtains the set of FQDNs included in the GUSS, which the UE is allowed to use. The set of FQDNs may comprise a single FQDN or a plurality of FQDNs, and are listed per NAF. The UE then derives (step 6.2) an application specific key Ks_NAF based on the master key Ks and a NAF_ID. The NAF_ID is a concatenation of the FQDN of the NAF and the Ua security protocol identifier (indicated as PROTO_ID in FIG. 6). The concatenation is indicated in FIG. 6 as NAF_ID=FQDN||PROTO_ID, but the NAF identifier may also be constructed in a different way than the NAF_ID. The UE then sends an application request to the NAF (step 6.3) in a similar manner as described previously, whereby the request comprises the B-TID. At the NAF, on receipt of the request, an authentication request (step 6.4) comprising the B-TID is sent to the BSF. The NAF does not determine and validate a NAF_ID, as in step 2.4.1) of FIG. 2. On receipt of the authentication request, the BSF determines the correct FQDN by referencing the GUSS associated with the UE. The FQDN is the same as the one used by the UE in step 6.2). The NAF_ID is determined by the BSF and the Ks_NAF is constructed by the BSF (step 6.5). The Ks_NAF is sent to the NAF in an authentication answer (step 6.6). The NAF and the UE now both know the value of Ks_NAF and they can use that key to protect communication (step 6.7) between the NAF and the UE over reference point Ua. A Transport Layer Security (TLS) network protocol may be used for the communication between the NAF and the UE. Step 6.5) in FIG. 6 replaces step 2.4.1) in FIG. 2, and the NAF no longer needs to forward a NAF_ID to the BSF.

This first embodiment does not comply with the 3GPP TS 33.220 Technical Specification in the following respects. The first embodiment departs from clause 4.5.2 of 3GPP TS 33.220 in that the GUSS of this embodiment includes the set of FQDNs the UE is allowed to use for a particular NAF while the GUSS disclosed in clause 4.5.2 does not include a set of FQDNs. The first embodiment departs from clause 4.5.3 in that the NAF of the first embodiment does not determine, validate or send the NAF_ID while the NAF disclosed in clause 4.5.3 is arranged to carry out those steps. The deployment and administration of the NAF node is simplified when compared to the 3GPP TS 33.220 Technical Specification.

Figure 7:
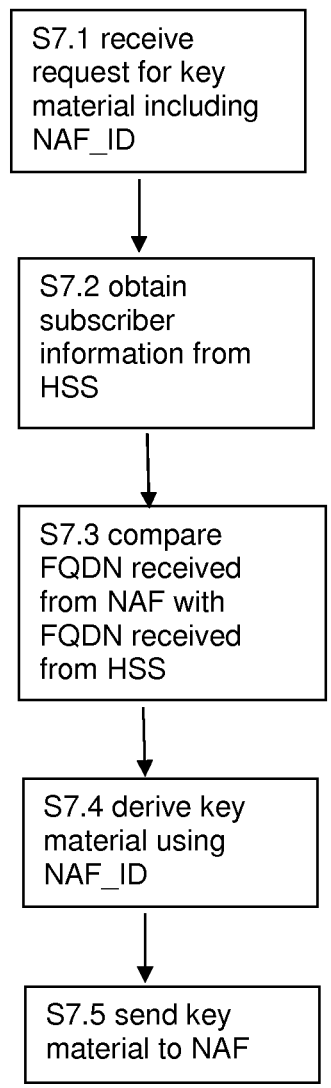
FIG. 7 is a flow diagram illustrating a method of authorising a subscriber user equipment according to a second embodiment.

A second embodiment is illustrated in FIG. 7, which is a flow diagram illustrating method steps at the BSF for generating an authentication answer. In the second embodiment, the NAF still sends a request for key material including the NAF_ID to the BSF and the request is received (S7.1) by the BSF. The BSF obtains subscriber information from the HSS (S7.2). Based on the subscriber information obtained from the HSS, the BSF validates the NAF_ID by comparing (S7.3) the FQDN received from the NAF with the FQDN obtained from the HSS with the subscriber information. If the received FQDN matches one of the FQDNs listed for the NAF in the subscriber information, the NAF_ID is validated. Steps S7.4 and S7.5 are the same as steps S5.3 and S5.4 of FIG. 5. The role of validating the NAF_ID is moved from the NAF to the BSF, thereby reducing the administrative burden on the NAF node.

Figure 8:
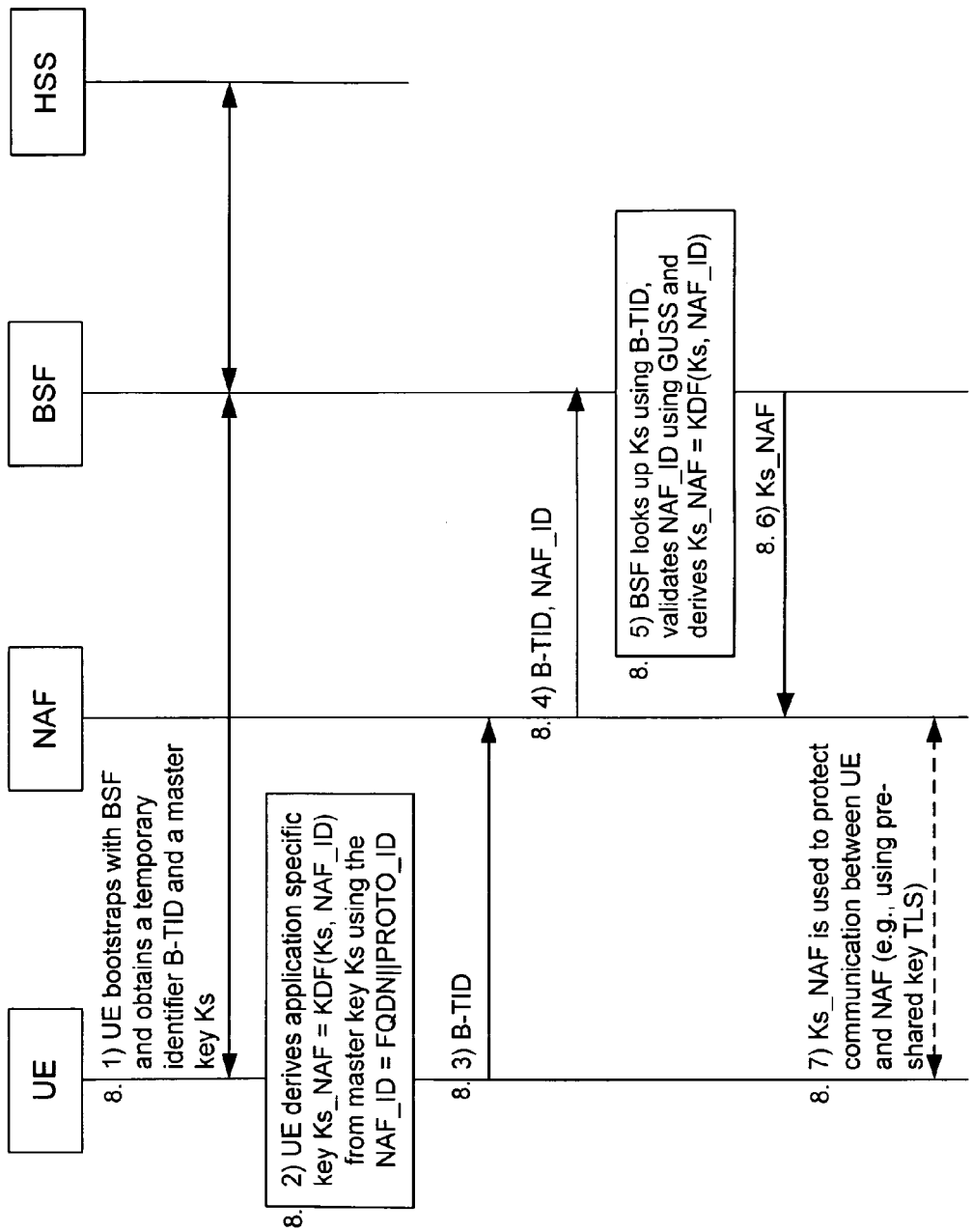
FIG. 8 illustrates a signalling flow associated with the second embodiment.

This second embodiment is illustrated in more detail in FIG. 8. Steps 8.1) to 8.3) are the same as steps 6.1) to 6.3) of the first embodiment. In step 8.4), the NAF forwards a NAF_ID (shown as a NAF_ID in FIG. 8) to the BSF in an authentication request. On receipt of the authentication request, the BSF identifies the Ks using the B-TID. The BSF also determines whether the user is authorised to use the NAF_ID (i.e. the BSF validates the NAF_ID) by considering whether the FQDN, on which the received NAF_ID is based, is provided within the GUSS. If the FQDN, on which the received NAF_ID is based, is provided within the GUSS, the NAF_ID is validated. If the FQDN, on which the received NAF_ID is based, does not match an FQDN provided with the GUSS, the NAF_ID is not validated and the BSF will indicate this in a reply to the NAF and the NAF will then send a bootstrapping renegotiation request to the UE. After validation of the NAF_ID at the BSF, the remaining steps (8.5, 8.6 and 8.7) are the same as in the first embodiment (6.5, 6.6 and 6.7).

This second embodiment may be used when a single UE is allowed to access the same NAF using different FQDNs. For example, an operator could have two services available under two different FQDNs but using the same NAF.

The second embodiment requires fewer specification changes than the first embodiment. The second embodiment does not, however, comply with the 3GPP TS 33.220 Technical Specification in the following respects. The second embodiment departs from clause 4.5.2 of 3GPP TS 33.220 in that the GUSS of this embodiment includes the set of FQDNs the UE is allowed to use while the GUSS disclosed in clause 4.5.2 does not include a set of FQDNs. The second embodiment departs from clause 4.5.3 in that the NAF of the second embodiment does not validate the NAF_ID while the NAF disclosed in clause 4.5.3 is arranged to validate the NAF_ID. The deployment and administration of the NAF node is simplified when compared to the 3GPP TS 33.220 Technical Specification.

Table 1 shows a sample GUSS illustrating how and where the application specific information can be included. In this particular example, there are two NAF identities associated with the user: openid-naf.operator.com and kms.operator.com. When the user contacts one of these NAF identities he is only allowed to use one of the NAF identifiers (which are in this case NAF_IDs) which are listed in Table 1 beneath the respective NAF identities. By way of background, the NAF_ID shown in Table 1 is base64 encoded.

The NAF identities openid-naf.operator.com and kms.operator.com in Table 1 are local NAF identities which are independent of the NAF identifier (NAF_ID). A local NAF identity may identify a particular NAF at the BSF without identifying a corresponding reference point Ua between the NAF and the UE. If the Ua reference point is not identified by the local NAF identity, the local NAF identity also does not include the Ua security protocol identifier PROTO_ID. Typically, a NAF would already have a local NAF identity. For example, if the security of the Zn reference point is based on the Diameter protocol, the local NAF identity would be the FQDN in an Origin-Host field of a Diameter request. Alternatively, the security may be based on an Internet Protocol Security (IPSEC) protocol or a TLS protocol, in which case the local NAF identity would be an identifier used in those protocols.

The section of the sample GUSS in Table 1 starting with <nafList> and ending with </nafList> is the section concerning the data of a specific user, or group of users. The NAF_ID "GNhcbGVhc3VyZS4" is the NAF_ID used for the key derivation. The two NAF_IDs "Npb24dGhlci" and "GNhcmhc3VyZS4" are examples of a plurality of NAF_IDs used to identify the single NAF (identity) kms-naf.operator.com, as discussed in relation to the second embodiment.

An example of a model in which multiple FQDNs may be used is the Software-as-a-Service (SaaS) cloud model. For example, if a telecom operator wants to offer a Key Management Service (KMS) to users of several companies, it may offer a KMS service under a plurality of FQDNs. A user from company A may use the service under name kms.companyA.com and a user from company B may use the service under name kms.companyB.com. Another example of an SaaS business model is company Z offering two services, free.compZ.com and registered.compZ.com, from a single NAF. The embodiments discussed above reduce the administrative burden on the NAF nodes by moving the steps of determining and/or validating of the NAF_ID to the BSF.

A further advantage of the embodiments discussed above relates to controlling the extent of user access to a service. For example, in a Multimedia Broadcast Multicast Service there can be several Broadcast-Multicast Service Centers (i.e. several NAFs) serving different types of content and the operator may want to limit a user's access to the different types of content depending on the user's subscription (e.g., a bronze, silver, or gold subscription). This type of content access control could be enforced by only including a specific set of Broadcast-Multicast Service Centers (i.e. NAFs) in the user's GUSS. Additional authorization information may be included within the GUSS if more fine grained access control is needed.

TABLE 1

```
<guss id="358500004836551@ims.mnc050.mcc358.3gppnetwork.org">
    <bsfInfo>
        <lifeTime>86400</lifeTime>
    </bsfInfo>
    <ussList>
        <uss id="1" type="1" nafGroup="A">
            <uids>
                <uid>tel:358504836551</uid>
                <uid>lauri.laitinen@operator.com</uid>
                ...
            </uids>
            <flags>
                <flag>1</flag>
                ...
            </flags>
        </uss>
        ...
    </ussList>
    <nafList>
        <naf id=openid-naf.operator.com>
            <nafids>
                <nafid>GNhcbGVhc3VyZS4=</nafid>
            <nafids>
        </naf>
        <naf id=kms-naf.operator.com>
            <nafids>
                <nafid>Npb24dGhlci</nafid>
                <nafid>GNhcmhc3VyZS4=</nafid>
            <nafids>
        </naf>
    </nafList>
</guss>
```

The invention claimed is:

1. A method of authorising a subscriber user equipment to access a Network Application Function, NAF, in a Generic Bootstrapping Architecture, GBA, the method comprising, at a Bootstrapping Server Function, BSF:
   receiving a request for key material for the subscriber user equipment from the NAF, wherein the NAF is associated with one or more NAF identifiers, and wherein said request received from the NAF does not contain a NAF identifier;
   obtaining subscriber information from a Home Subscriber System, HSS, the subscriber information including one or more NAF identifiers that are valid for the subscriber;
   authorising the subscriber user equipment on the basis of the identity of said NAF and the one or more NAF identifiers included within the subscriber information;
   in the event that the subscriber user equipment is authorised, deriving the key material using a NAF identifier that is contained within said subscriber information; and
   sending the key material to said NAF.

2. The method of claim 1, wherein said request includes a NAF identifier and said authorising comprises matching the NAF identifier contained within the request with a NAF identifier included in said subscriber information.

3. The method of claim 1, wherein the subscriber information comprises GBA User Security Settings, GUSS.

4. The method of claim 1, wherein the NAF identifier is constructed using a Fully Qualified Domain Name, FQDN.

5. An apparatus configured to operate as a Bootstrapping Server Function, BSF, for use in a Generic Bootstrapping Architecture, GBA, the apparatus comprising:
   a first receiver configured to receive a request for key material for the subscriber user equipment from a Network Application Function, NAF, wherein the NAF is associated with one or more NAF identifiers, and wherein said request received from the NAF does not contain a NAF identifier;
   a second receiver configured to receive subscriber information from a Home Subscriber System, HSS, the subscriber information including one or more NAF identifiers that are valid for the subscriber;
   a first processor configured to authorize the subscriber user equipment on the basis of the identity of said NAF and the one or more NAF identifiers included within the subscriber information;
   a second processor configured, in the event that the subscriber user equipment is authorised, to derive the key material using a NAF identifier that is contained within said subscriber information; and
   a sender configured to send the key material to said NAF.

6. The apparatus of claim 5, wherein said request comprises a NAF identifier, the first processor further being arranged to match the NAF identifier contained within the request with a NAF identifier included in said subscriber information.

7. The apparatus of claim 5, wherein the subscriber related information comprises GBA User Security Settings, GUSS.

8. The apparatus of claim 5, wherein the NAF identifier is constructed using a Fully Qualified Domain Name, FQDN.

9. A computer program product comprising a non-transitory computer readable medium storing computer readable code which, when run on an apparatus, causes the apparatus to operate as the apparatus according to claim 5.

10. A method of authorising a subscriber user equipment to access a Network Application Function, NAF, in a Generic Bootstrapping Architecture, GBA, the method comprising:
    at the subscriber user equipment, sending a request to the NAF, wherein the NAF is associated with one or more NAF identifiers;
    receiving the request at the NAF;
    at the NAF, sending an authentication request to a Bootstrapping Server Function, BSF;
    receiving the authentication request at the BSF;
    at the BSF, obtaining subscriber information from a Home Subscriber System, HSS, the subscriber information including one or more NAF identifiers that are valid for the subscriber;
    at the BSF, authorising the subscriber user equipment on the basis of the identity of said NAF and the one or more NAF identifiers included within the subscriber information;
    in the event that the subscriber user equipment is authorised, deriving key material using a NAF identifier that is contained within said subscriber information;
    sending the key material to the NAF; and
    receiving the key material at the NAF,
    wherein said authentication request sent by the NAF does not contain a NAF identifier.

11. The method of claim 10, further comprising:
    at the user equipment, obtaining a temporary identifier, B-TID, and a master key from the BSF and including the B-TID in said request sent to the NAF;
    at the BSF, identifying a correct NAF identifier in the subscriber information using the B-TID.

12. The method of claim 11, wherein said authentication request includes a NAF identifier and said authorising comprises, at the BSF, matching the NAF identifier contained within the request with a NAF identifier included in said subscriber information.

13. The method of claim 10, wherein the subscriber related information comprises GBA user security settings, GUSS.

14. The method of claim 10, wherein the NAF identifier is constructed using a fully qualified domain name, FQDN.

* * * * *